United States Patent [19]

Garruto

[11] 3,969,832

[45] July 20, 1976

[54] TEACHING AID

[76] Inventor: Peter G. Garruto, 2791 Florida Ways Road, Apt. 107, Lake Worth, Fla. 33460

[22] Filed: Aug. 18, 1975

[21] Appl. No.: 605,297

[52] U.S. Cl. ................................. 35/75; 35/35 H
[51] Int. Cl.² ................................. G09B 1/28
[58] Field of Search ................ 35/31 E, 35 H, 75; 40/65, 109

[56] References Cited
UNITED STATES PATENTS

| | | | |
|---|---|---|---|
| 1,289,743 | 12/1918 | Hammond | 35/75 |
| 2,668,371 | 2/1954 | Artmann | 35/75 X |
| 2,952,923 | 9/1960 | Calabrese | 35/75 X |
| 3,758,971 | 9/1973 | Tarrant | 35/75 X |
| 3,765,107 | 10/1973 | Cameron | 35/75 X |

FOREIGN PATENTS OR APPLICATIONS

| | | | |
|---|---|---|---|
| 606,297 | 3/1926 | France | 35/75 |
| 503,229 | 12/1954 | Italy | 35/35 H |
| 123,858 | 3/1919 | United Kingdom | 35/35 H |

Primary Examiner—Harland S. Skogquist
Attorney, Agent, or Firm—Cushman, Darby and Cushman

[57] ABSTRACT

A teaching aid or the like comprising an open frame, a plurality of slide members reciprocal in the frame, and a pair of lenses extending across the open frame perpendicular to the general direction of reciprocation of the slide members. Each slide member has a pair of opposite faces, each face having formed thereon various indicia in lines. An indicia line on one face of a slide corresponds to an indicia line in the same relative position along the slide member on the opposite face of the slide. The lenses may be magnifying if desired.

8 Claims, 2 Drawing Figures

TEACHING AID

BACKGROUND AND SUMMARY OF THE INVENTION

The invention relates to a teaching aid for providing ready correlation between one word or symbol and a corresponding word and symbol. Other teaching aids have been known, such as shown in U.S. Pat. Nos. 1,289,743, 1,343,112, 3,089,258, and 3,477,146, but it is not believed that such prior art teaching aids have the advantages of the teaching aid according to the present invention or are as readily utilizable and compactly accessible. A teaching aid according to the present invention provides for a maximum disposition of corresponding indicia in a minimum amount of space, is compact, and requires a minimum amount of material for construction.

According to the present invention, a teaching aid is provided having an open frame construction with a plurality of slide members reciprocal therein. Each of the slide members has a plurality of words, symbols, phrases, or like indicia disposed on one face thereof, and a corresponding plurality of words, symbols, phrases or like indicia disposed on the opposite face thereof. A pair of lenses extend across the open frame between the sides thereof for cooperation with the slide faces. When a slide is moved so that one of the words, symbols, phrases, or like indicia on one face thereof is in cooperation with one lens, the corresponding word, symbol, phrase, or like indicia on the opposite face thereof is in cooperation with the other lens. The frame is open to provide for a minimal amount of construction materials, and the lens may be magnifying lens so that the words, symbols, etc. may be very small and still be legible when in operation, and the whole assembly is compact. A preferred use for a teaching aid according to the present invention is as a translator from one language to another, a word in one language being printed on one face of a slide member, and that word in another language being printed on the opposite face thereof in a corresponding position.

The primary object of the present invention is to provide an improved teaching aid. This and other objects of the invention will become clear from an inspection of the detailed description of the invention, and from the appended claims.

DETAILED DESCRIPTION OF THE INVENTION

Figure 1:
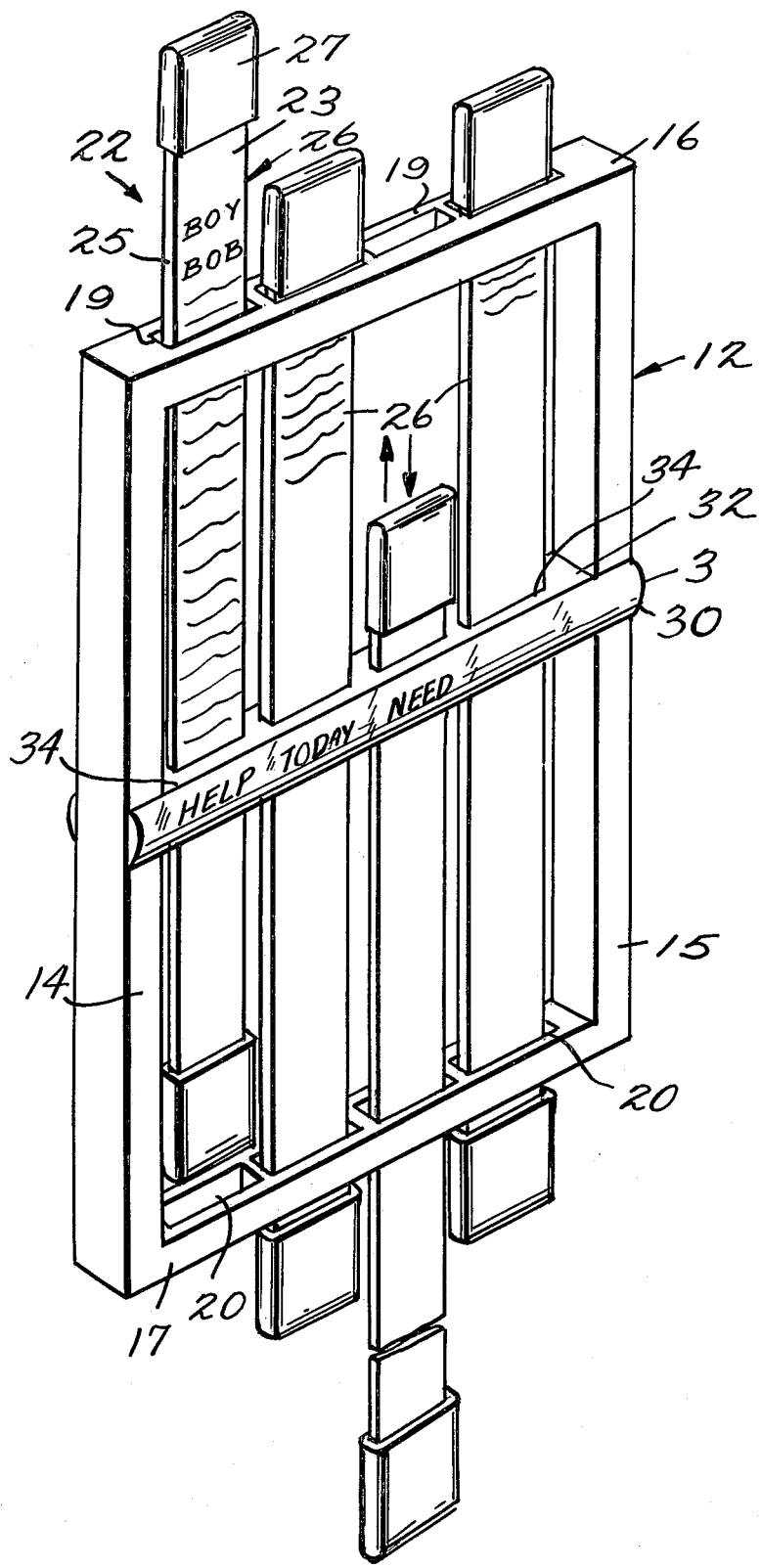
FIG. 1 is a perspective view of an exemplary teaching aid according to the present invention.

An exemplary teaching aid according to the present invention is shown generally at 10 in FIG. 1. The aid 10 includes an open frame 12 formed by generally side members or legs 14 and 15, and generally parallel top and bottom members or legs 16 and 17 transverse to members 14 and 15. The frame members 14–17 may be formed of any suitable material, such as plastic, metal, wood, etc.

Opposite frame members — for instance top 16, and bottom 17 — have a plurality of openings formed therein, for instance openings 19 in frame member 16, and openings 20 in frame member 17. Each of these openings is adapted to receive a slide member 22 therein, a plurality of slide members 22 being provided for reciprocation in the open frame 12 in a direction generally perpendicular to members 16 and 17.

Each of the reciprocal slide members 22 preferably comprises a main, plate-like body portion 25, having opposite generally flat faces 23 and 24, each of the faces having a number of words, symbols, or other indicia in columned line 26 formed (i.e. printed) thereon. An indicia line 26 formed on face 23 of a member 22 at a certain position therealong coincides with a corresponding word, symbol, etc. 26 formed on the opposite face 24 thereof. For instance, a word in one language on face 23 corresponds to that same word in a different language on the face 24, located at the same relative position on face 24 as the first word on face 23. Formed at each end of each slide member 22 there preferably is an end member 27 or 28, the members 27, 28 adapted to be grasped by a user's hand, and/or for limiting the movement of the slide members 22 with respect to the frame 12. The members 27, 28 may be removable if desired.

To provide a reference for lining up corresponding words, symbols, or other indicia on opposite faces 23, 24 of a slide member 22 there are disposed a pair of lenses 30 formed on either face of the open frame 12, and extending between frame members 14, 15 generally transverse to the direction of movement of the slide members 22. When a word, etc. on face 23 of a slide member 22 is matched up with lens 30, its corresponding word, etc. on face 24 of the member 22 is matched up with lens 31. The lenses may be magnifying lenses if desired so that the indicia may be formed on a very small scale on the members 22 to provide for a larger number of individual indicia on each member 22, while still being readable when brought into cooperation with the respective lenses 30, 31.

Figure 2:
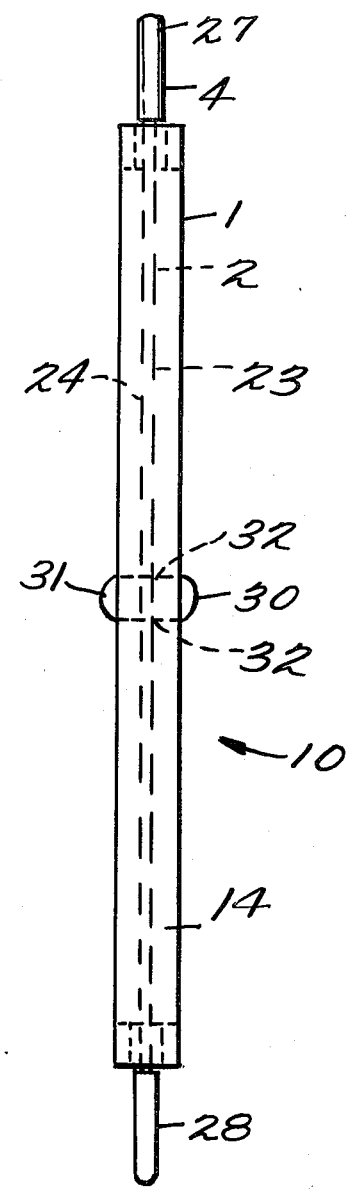
FIG. 2 is a side view of the teaching aid shown in FIG. 1.

Preferably, there are associated with the lenses 30, 31 a pair of spaced cross-members 32, one extending between the top portions of the lenses 30, 31, and one extending between the bottom portions of lenses 30, 31 (see FIG. 2). Each of the cross-members 32 has an opening formed therein for providing guidance of the middle portions 25 of the slides 22 in cooperation with the openings 19, 20. While the openings 19, 20 are of the same size (or slightly larger) and shape as the end portions 27, 28 of the slides 22, so that the end portions may slide therethrough, the openings 34 are only large enough to allow passage of the middle portions 25 of the slides 22, and not the ends 27, 28. Thus, when a portion 27 or 28 is moved far enough, it will abut a cross-member 32, and further movement thereof will be prevented. Thus the means 32 prevent inadvertent removal of the slides 22 from the frame 12, while providing guidance therefor.

A typical use of the aid 10 as shown in the drawings is as follows: A plurality of English words are printed on faces 23 of a plurality of slide members 22, and a plurality of French words that have the same meaning as the English words are printed on faces 24 of the members 22, words of the same meaning having the same relative position on each of the faces 23, 24. The members 22 are disposed to reciprocate in the openings 19, 20 (and 34) of the frame 12, and are movable to any selected position within the length of travel of the members 22. When an individual using the device 10 wishes to test his or her knowledge of the French counterparts of the words printed on the faces 23 of the members 22, the words on each slide 22 may be moved in succession into registry with lens 30 extending across frame 12. When the English word appears in the lens 30, the individual recites what he or she believes to be the French equivalent thereof, and then merely turns the frame around 180° (with the slide 22 in the same position) to view the word on face 24 of the slide member 22 registering in lens 31 to check to see whether or not he or she is right. When one gets to the end of a slide 22, the end portion 27 or 28 thereof abuts the cross portion 32, so that the slide remains positively guided.

While the invention has been herein shown and described in what is presently conceived to be the most practical and preferred embodiment, it will apparent to one of ordinary skill in the art that many modifications may be made thereof within the scope of the invention, and the disclosed structure may be used for a variety of purposes. For instance, the invention may be used as a decoder, a map locator, or to provide mathematical problems and answers. Any number of slides 22 may be provided, and the lenses 30, 31 (or other accessory lenses) may be located at any suitable relative position along the frame members 14, 15. Other modifications are also possible, thus it is intended that the invention be accorded the broadest interpretation of the appended claims so as to encompass all equivalent structures and devices.

What is claimed is:

1. A teaching aid comprising
   a. an open frame, said frame including a pair of generally parallel side legs, and top and bottom legs, said top and bottom legs being generally parallel to each other and generally transverse to said side legs,
   b. a plurality of cooperating openings formed in said top and bottom legs,
   c. a plurality of slide members received within cooperating openings in said top and bottom legs and reciprocal through said openings in a direction parallel to said side legs of said open frame, each slide member having a pair of opposite generally flat faces thereof, and each face having formed thereon a plurality of lines of indicia, each indicia line formed on one flat face of a given slide member having a corresponding indicia line formed in the same relative position on the opposite face of said given slide member, and
   d. a pair of lenses extending from one of said side legs to the other between said top and bottom legs of said open frame, and for receiving said slide member therebetween, said lenses extending generally parallel to said top and bottom frame legs and generally perpendicular to the direction of movement of said slide members, one lens for cooperation with a given indicia on one face of a slide member while the other lens cooperates with the corresponding indicia on the opposite face of said given slide member.

2. An aid as recited in claim 1 wherein said lenses are magnifying lenses whereby indicia on the respective faces of said slide members are magnified and easily readable when brought into cooperating relationship with said lenses.

3. An aid as recited in claim 2 further comprising enlarged end portions formed on each end of each of said slide members.

4. An aid as recited in claim 3 further comprising stop and guide means associated with said lenses for guiding reciprocation of said slide members and for preventing movement of the enlarged end portions of said slide members past said lenses.

5. An aid as recited in claim 4 wherein said guide and stop means comprise a pair of plates associated with said lenses, one plate connected between the tops of the lenses, and the other plate connected between the bottoms of the lenses, said plates having a plurality of openings formed therein, each opening being large enough to receive a body portion of said slide members but not being large enough to receive an enlarged end portion of said slide members.

6. An aid as recited in claim 1 wherein each of said slide members includes a body portion with an enlarged end portion formed at either end thereof.

7. An aid as recited in claim 6 wherein each of said slide member body portions is as long as the distance between the top of said top leg and the bottom of said bottom leg of said open frame, and wherein said end portions of each slide member extend past the top of said top leg and the bottom of said bottom leg.

8. An aid as recited in claim 1 further comprising a pair of cross members extending between said frame side legs and extending generally parallel to said top and bottom legs, each of said cross members being disposed adjacent the top or bottom of said lenses, and having a plurality of openings formed therein for receipt of said slide members.

* * * * *